United States Patent [19]
Balsara et al.

[11] Patent Number: 6,065,012
[45] Date of Patent: May 16, 2000

[54] SYSTEM AND METHOD FOR DISPLAYING AND MANIPULATING USER-RELEVANT DATA

[75] Inventors: Cyrus Balsara, Redmond; Debbie Lynn Cargile; Gay Lynn Gilmore, both of Seattle; Michael Elton Hewitt, Kirkland; Kevin Kahl, Redmond; Sean Edward Purcell, Seattle, all of Wash.

[73] Assignee: Microsoft Corporation, Redmond, Wash.

[21] Appl. No.: 09/031,638

[22] Filed: Feb. 27, 1998

[51] Int. Cl.⁷ ........................................ G06F 17/30
[52] U.S. Cl. .................... 707/102; 707/103; 707/201; 345/331; 345/335
[58] Field of Search .................... 707/10, 103, 104, 707/202–203; 709/303; 345/346, 329, 330–335; 705/35–37

[56] References Cited

U.S. PATENT DOCUMENTS

| | | | |
|---|---|---|---|
| 5,764,983 | 11/1995 | Chew et al. | 709/302 |
| 5,835,914 | 2/1997 | Brim | 707/206 |
| 5,911,066 | 2/1994 | Williams et al. | 709/300 |
| 5,933,830 | 5/1997 | Williams | 707/100 |

OTHER PUBLICATIONS

Denning, Adam, "ActiveX Controls Inside Out," ©1997 Microsoft Press, 2nd edition, pp. xiii–xv, 3–15, 19–23, 67, 439–441, and 445–446.

*Primary Examiner*—Hosain T. Alam
*Attorney, Agent, or Firm*—Jones & Askew, LLP

[57] ABSTRACT

A dynamic summary view is generated by defining an HTML page that links data binding HTML tables and other HTML controls to predetermined data within a storage of data. For each type of data, a parameter is determined which characterizes the predetermined data from the other data within the storage. A control module related to a specific type of data, searches the storage, determines the predetermined data using the parameter and displays the predetermined data via a data binding HTML table within a section of the dynamic summary view. Upon detecting a manipulation request, such as when a user clicks a button of the mouse, the appropriate control module accesses a subset of the program module that created the predetermined data. This is advantageously done without invoking the entire program module. A subset of the program module can be accessed by executing a script to call defined methods of objects within the program module. A subset of the program module also can be accessed by calling a control module defined within the program module. The view is also dynamic in that it is updated to display "live" data by monitoring for trigger events indicating the underlying data has changed and updating the predetermined data accordingly.

6 Claims, 7 Drawing Sheets

SYSTEM AND METHOD FOR DISPLAYING AND MANIPULATING USER-RELEVANT DATA

TECHNICAL FIELD

This invention generally relates to generating a dynamic summary view of data and, more particularly described, relates to generating a dynamic summary view of predetermined data created by a program module with the capability to manipulate the predetermined data within in the dynamic summary view without invoking the program module.

BACKGROUND OF THE INVENTION

In an information-rich computing environment, a user may create a variety of information or data. For example, the user may create or receive electronic mail. The user may create task lists of critical items that must be completed by certain dates. The user may also create a calendar of appointments. This data may be created by one or more programs such as an electronic mail program module or a calendar program module.

It can be time-consuming for a user to get a complete summary of their most important information, such as their latest electronic mail, their current tasks to be performed today, and what appointments are scheduled during the current day. It may be timeconsuming because the user may have to open a variety of folders to view the most relevant information or data. These folders may be locally stored and maintained or may be spread out across a large data network, such as the global Internet. Thus, the user would be left having to constantly navigate the user's online local and remote storage and switch amongst the numerous folders within which the user has relevant information.

Additionally, it may be time-consuming for a user to obtain an information summary because the user may have to launch individual programs to access and manipulate such important information. Once the user has launched the individual programs, the user is forced to spend time switching between individual programs when attempting to modify or manipulate the information.

Information management programs have attempted to solve these problems in a variety of ways. Traditional personal information management (PIM) computer programs may offer "static" summaries. These static summaries may be printed out but lack the ability to manipulate the information or data once displayed (i.e., printed) for the user. For example, a printed summary of task items for the current day may be printed out and viewed by the user. However, as the tasks are accomplished, the user is not able to simply check off the appropriate task item from the printed summary list and have data underlying the tasks list appropriately updated. Furthermore many traditional PIM computer programs do not have the ability to customize the information presented to the user or to perform "live" updating of the information.

Other application programs provide a type of customized summary view of important data or information. An example of such a customized summary view is a personalized home page for the World Wide Web (WWW) on the Internet. However, these summary views of important information lack the ability to manipulate the information directly from the summary view. If the underlying information within the customized summary view is provided by third party information providers (such as stock quotes, sports scores, or news headlines), there is no way for the user to manipulate the information. Even if manipulation of the information is possible, the user is still required to invoke the program module that created the information and to modify the information via the program module. As previously mentioned, this is undesirable because it is time-consuming and inefficient for the user. Use of such a summary view of important information may become cumbersome if a user desires to change or modify a number of different types of information.

Thus, there is a need for a system for generating a dynamic summary view of predetermined data (such as data which a user determined to be most relevant or important), which (1) allows manipulation of the data without invoking the program module that created the data, (2) is capable of "live" updating of the data within the dynamic summary view, and (3) is customizable on which data is determined to be important or relevant.

SUMMARY OF THE PRESENT INVENTION

The present invention satisfies the above-described needs by providing a system for generating a dynamic summary view of predetermined data created by a program module. In general, the dynamic summary view is dynamic because it is capable of manipulating predetermined data, such as user-relevant data, using only a subset of the program module responsible for creating the predetermined data. This is useful for fundamental manipulations of the important or predetermined data presented on the dynamic summary view.

In general, the present invention provides a method for generating a dynamic summary view of predetermined data created by a program module. A parameter characterizing the predetermined data from other data is determined typically by selecting a data filter. Essentially, the data filter is a software mechanism for determining user-relevant data from other data stored within a storage. The storage maintaining the predetermined data is searched for the predetermined data typically using the characterizing parameter. In this manner, the dynamic summary view is customizable as to what kind of data is presented in the view. The predetermined data is then displayed in the dynamic summary view, preferably within a section of the dynamic summary view, advantageously providing a single view of the predetermined data.

The predetermined data displayed in the dynamic summary view is then manipulated without the need to invoke the program module that created the predetermined data. For example, the status of an appointment displayed in the dynamic summary view can be modified without having to invoke the program module that created the appointment. This advantageously avoids the time-consuming and often frustrating need to launch multiple program modules and to switch between program modules when manipulating data displayed on the dynamic summary view.

Manipulating the predetermined data in this way may further comprise detecting a manipulation request associated with the predetermined data. A typical manipulation request may be a click of a mouse when a cursor is positioned over the predetermined data as displayed within the dynamic summary view. In response to the detected manipulation request, a subset of the program module may be accessed without invoking the program module. Accessing the subset of the program module may be accomplished by calling a method from an object defined within the program module. Accessing the subset of the program module may also be accomplished by calling a control module, such as a hard coded ActiveX control, defined within the program module.

Upon accessing the subset of the program module, the predetermined data may be modified using the subset of the program module without invoking the program module. The modified predetermined data may then be displayed in the dynamic summary view Additionally, the predetermined data may be monitored to detect a trigger event. A trigger event is associated with a change to the predetermined data within the storage. An example of a trigger event is when an electronic mail message has been read and the status of the read mail message is changed. In response to the trigger event, the predetermined data is updated in the section of the dynamic summary view.

The present invention also provides a computer-readable medium on which is stored a computer program. The computer program has instructions, which when executed by a computer, performs steps for generating a dynamic summary view of predetermined data created by a program module. First, a parameter is determined which characterizes the predetermined data (i.e., user-relevant data) from other data maintained within a storage. The storage is then searched for the predetermined data using the parameter. After searching, the predetermined data is displayed in one of a number of display sections of the dynamic summary view depending on the type of the program module that created the predetermined data. For example, if the predetermined data is related to calendar appointments, then the predetermined data is displayed in a calendar display section of the dynamic summary view.

Once the predetermined data is displayed, a manipulation request is detected associated with the predetermined data. In response to the manipulation request, a subset of the program module is accessed without invoking the program module. Accessing the subset of the program module may be accomplished by executing a script to call a method from an object defined within the program module. Accessing the subset of the program module may also be accomplished by accessing a control module defined within the program module. After accessing the subset of the program module, the predetermined data displayed in the dynamic summary view is modified using the subset of the program module without invoking the program module. The modified predetermined data may then be displayed in the dynamic summary view.

Additionally, the predetermined data may be monitored to detect a trigger event. A trigger event is associated with a change to the predetermined data within the storage. An example of a trigger event is when an electronic mail message has been read and the status of the read mail message is changed. Monitoring may be accomplished by periodically monitoring the predetermined data for the trigger event or may be accomplished by receiving a trigger associated with the predetermined data indicating the trigger event has occurred. In response to the trigger event, the predetermined data is typically updated in the section of the dynamic summary view.

In another aspect of the present invention, the present invention provides a computer system for generating a dynamic summary view of predetermined data created by a program module. The computer system includes a processor and a display device coupled to the processor. The display device is used to display the dynamic summary view to a user. The computer system also includes a storage device, such as a local or remote memory storage device, coupled to the processor. The storage device maintains the program module and data.

Within the computer system, the processor is able to determine a parameter which characterizes part of the data maintained within the storage device as the predetermined data. This predetermined data is user-relevant data. The processor is also able to characterize the predetermined data from other data within the storage device based upon a parameter. An example of such a parameter may be the scheduled time for an appointment.

Furthermore, the storage device may also maintain a data filter used to help determine the predetermined data from the data within the storage device. In this situation, the processor may also be operative to select the data filter or display a selection dialog associated with the data filter in order to make a selection.

The processor can search the storage device for the predetermined data using the parameter and then display the predetermined data on the display device within the dynamic summary view. In the above example, the processor would search the storage device for today's appointments and display only today's appointments on the display device within the dynamic summary view.

The processor can also manipulate the predetermined data displayed in the dynamic summary view without invoking the program module. In more detail, the processor can detect a manipulation request associated with the predetermined data and then access a subset of the program module without invoking the program module. The subset of the program module is also maintained on the storage device. The processor may access the subset of the program module without invoking the program module by calling a method from an object defined within the program module. The processor may also access the subset of the program module without invoking the program module by calling a control module defined within the program module. Once the processor has accessed the subset of the program module, the processor can modify the predetermined data using the subset of the program module without invoking the program module and may display the modified predetermined data in the dynamic summary view on the display device.

Additionally, the processor can monitor the predetermined data to detect a trigger event. A trigger event is when the predetermined data has changed within the storage device. The processor may monitor the predetermined data to detect the trigger event by periodically monitoring the predetermined data to detect when the predetermined data has been modified within the storage device. The processor can also monitor the predetermined data to detect the trigger event by receiving a trigger associated with the predetermined data indicating that the predetermined data has been modified within the storage device. In response to the trigger event, the processor can update the predetermined data as displayed within the dynamic summary view.

The present invention and its advantages, those described above and otherwise, will be appreciated from studying the following detailed description and drawings, and the appended claims.

DETAILED DESCRIPTION

Figure 1:
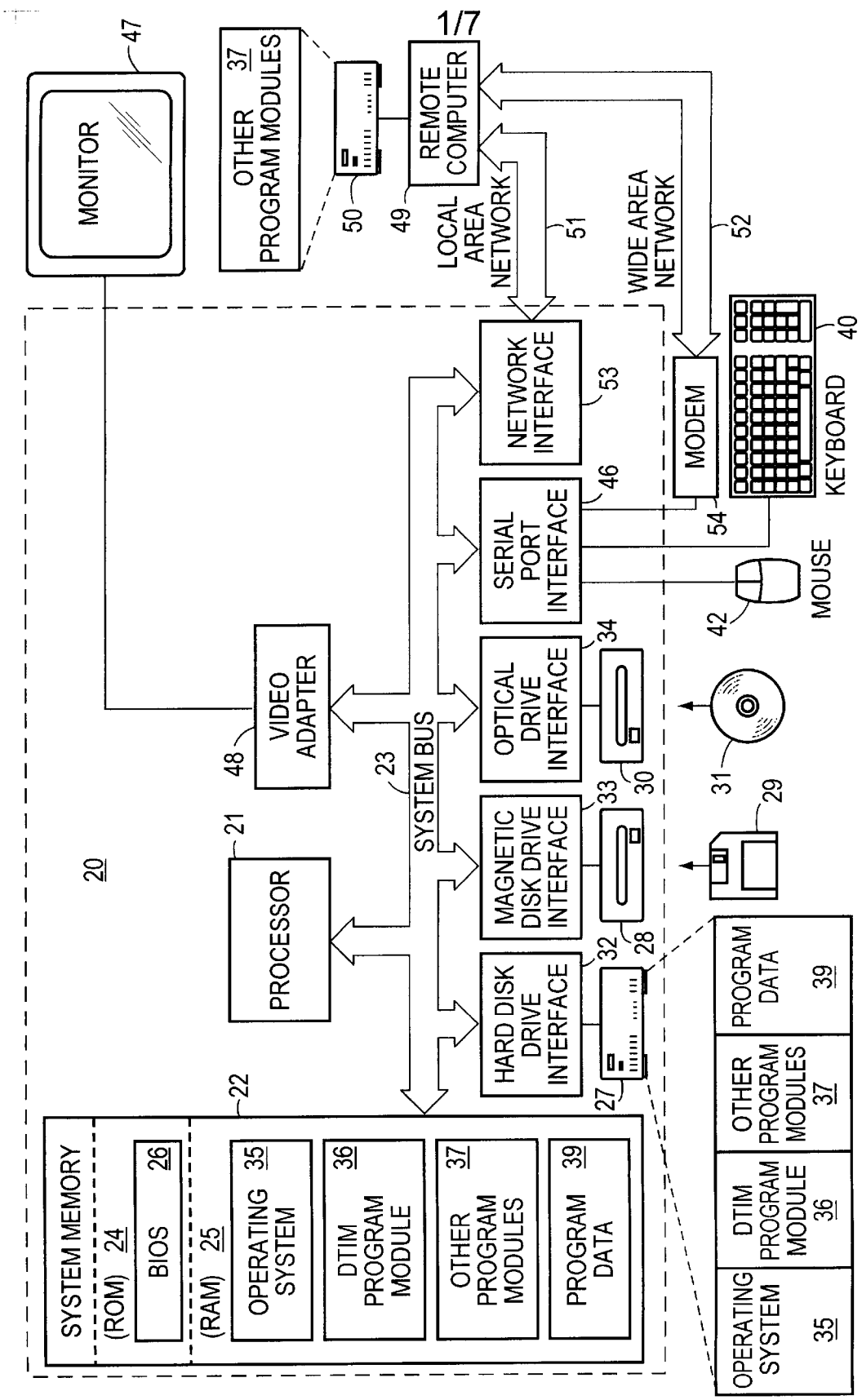
FIG. 1 is a block diagram of a personal computer that provides an exemplary operating environment for an embodiment of the present invention.

The present invention can generate a dynamic summary view of predetermined data created by a program module. The dynamic summary view has the capability to manipulate the predetermined data shown within the view without having to invoke the program module. In an exemplary embodiment of the present invention, a summary hypertext markup language (HTML) page (more generally called a dynamic summary view) is generated typically using control modules (such as ActiveX controls) to provide a summarized view of a user's important user-controlled data. Examples of such user-controlled data include desktop information management (DTIM) data items such as electronic mail, pending tasks, and the most recent documents used on a computer.

Each section of the dynamic summary view is typically generated by defining a HTML table that links or binds parts of the table to predetermined data within a storage of data, such as a storage of DTIM data items. An HTML table of this kind is typically referred to as a data binding HTML table. Control modules, such as an ActiveX control, for each type of data provide the linking or binding mechanism between the HTML table column definition and the data. Thus, the control module for each type of data searches the storage (such as a storage of DTIM data items), determines the predetermined data (such as the most important tasks, the calendar items for today, how many unread electronic mail messages are present, etc.) and then displays the predetermined data within the appropriate data binding HTML table as a section of the summary HTML page.

The summary HTML page is customizable for display attributes (such as fonts, size, etc.) and for content. The customization of the content is based upon what the user deems to be important or desirable to be presented. A user can determine or select what kind of data is to be displayed by making selections of parameters on a customization page linked to the summary HTML table.

The dynamic summary view related to the summary HTML page is dynamic because it is capable of manipulating the predetermined data using only a subset of the program module responsible for creating the predetermined data. This is useful for fundamental manipulations of the important or predetermined data presented on the dynamic summary view. In addition to manipulating the data, the dynamic summary view is dynamic because it can respond to data updates by updating the presentation of the data.

The preferred embodiment of the present invention is represented by a desktop information management (DTIM) program module called "MICROSOFT OUTLOOK 98" developed by Microsoft Corporation of Redmond, Washington designed to work with Microsoft Corporation's "WINDOWS 95" and "WINDOWS NT 4.0" operating systems. Briefly described, the "MICROSOFT OUTLOOK 98" program module is a desktop information management program module that allows users to manage their own calendar, tasks or "to-do" list, notes, contacts, and electronic mail messages via different program modules internal to the DTIM program module. Each program module maintains information or data about things such as appointments, task lists, mail messages, etc., in specific data items in memory. The DTIM program module has control modules that are used to generate the dynamic summary view of particular data maintained within these specific data items. The aspect of generating the dynamic summary view of the particular data and manipulating the data without invoking the program module responsible for creating the data is the focus of the present invention.

Figure 2:
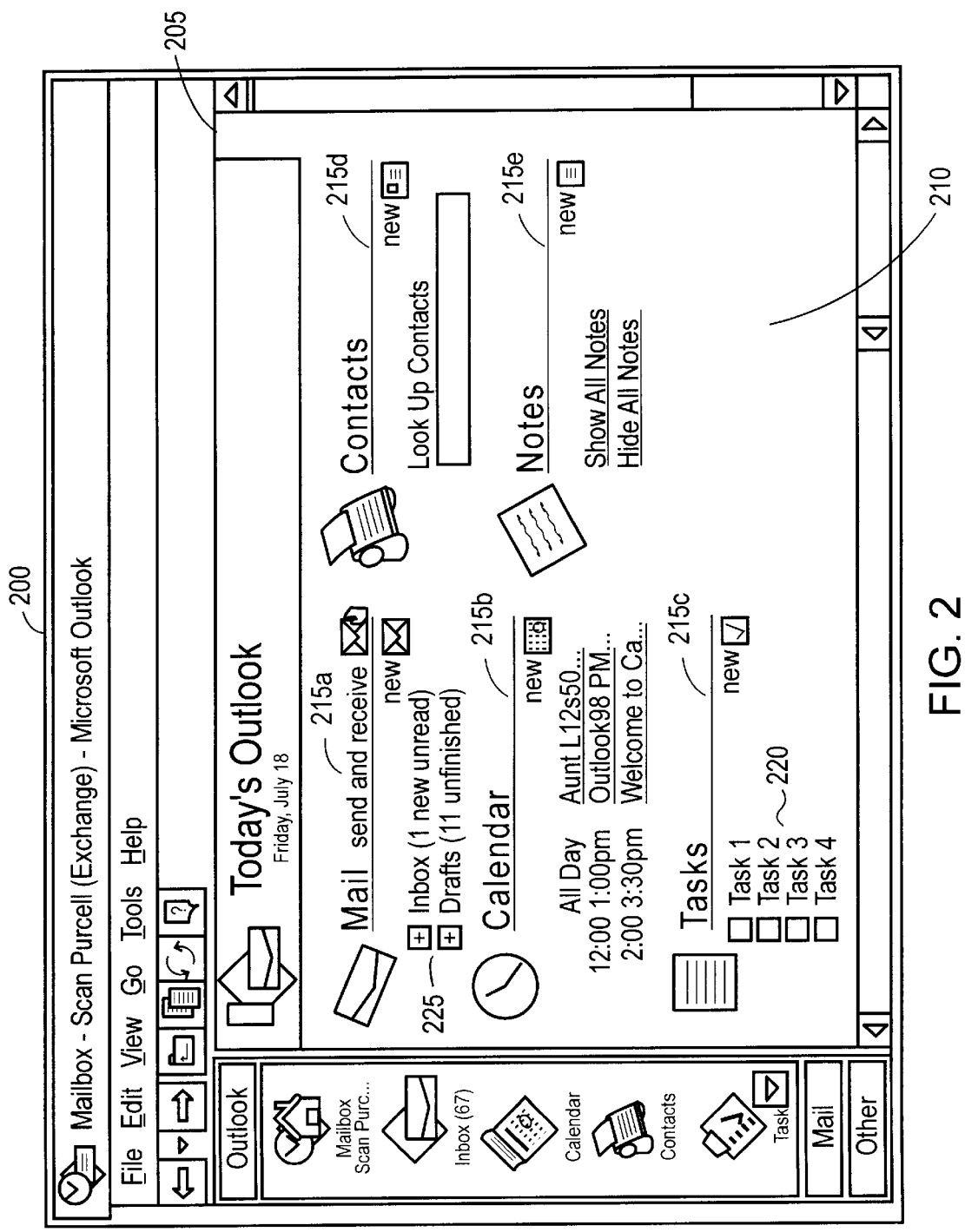
FIG. 2 is a screen image of an exemplary dynamic summary view of predetermined data.
Figure 3:
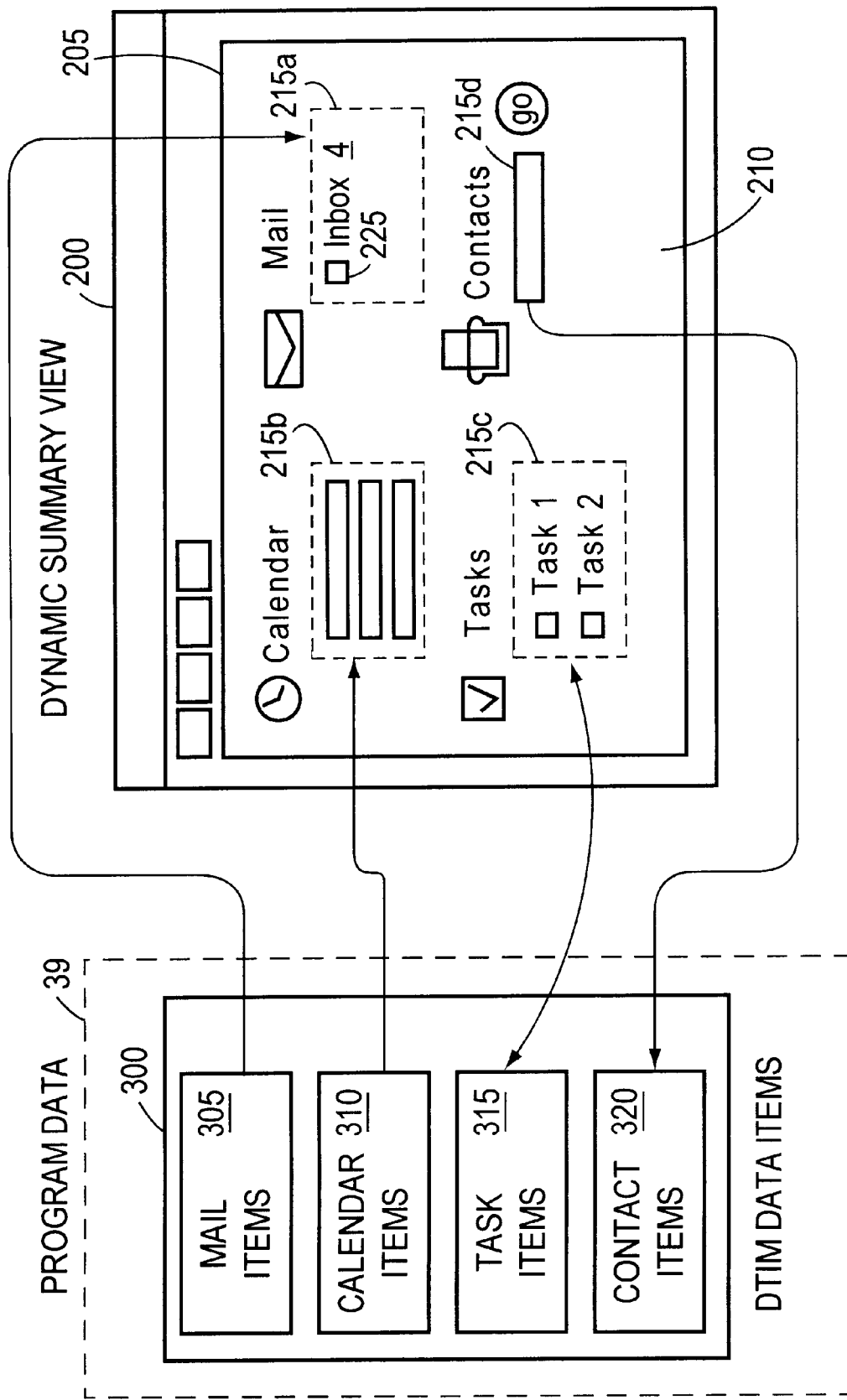
FIG. 3 is a diagram illustrating how the predetermined data created by various program modules is related to different sections of a dynamic summary view in an exemplary embodiment of the present invention.
Figure 4:
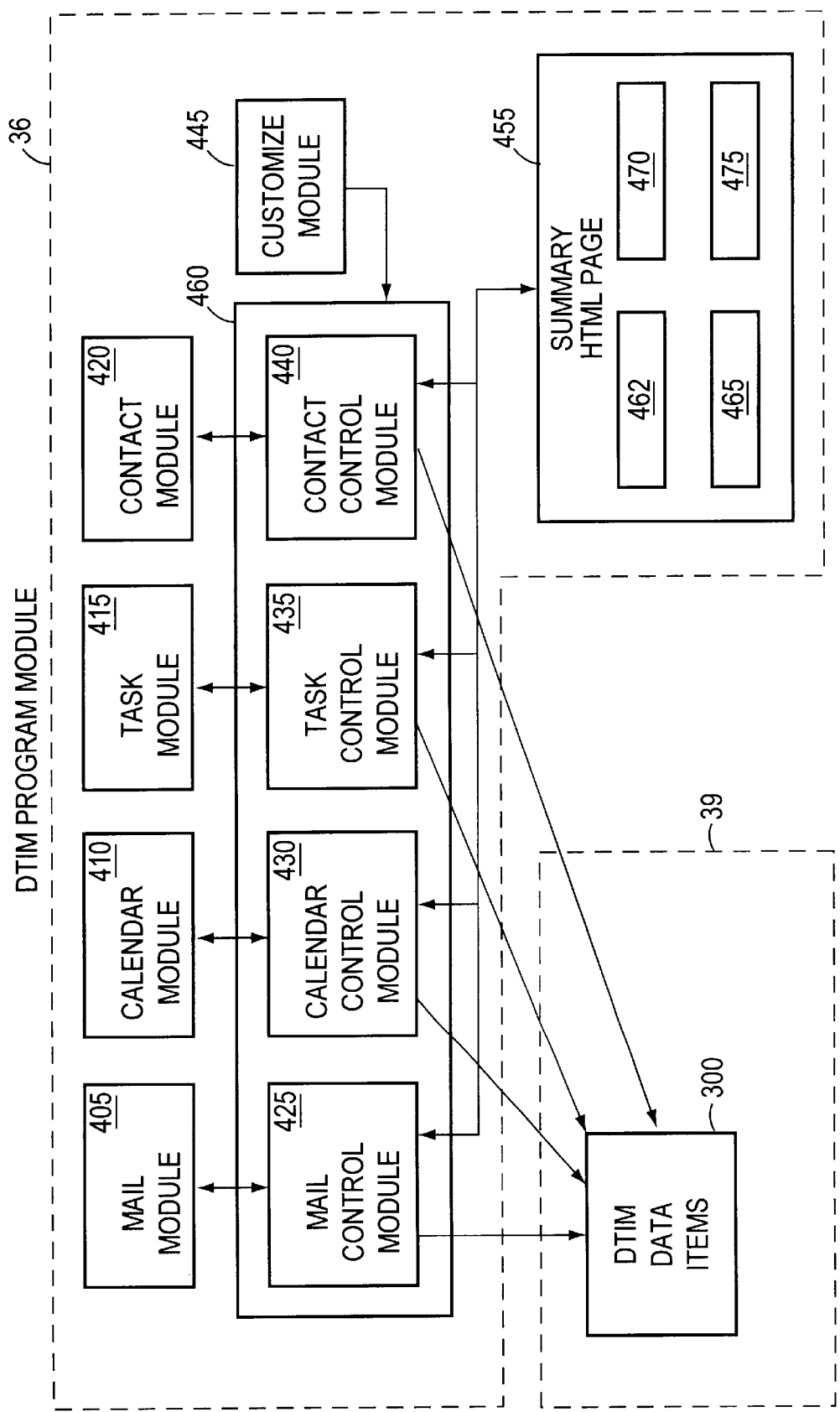
FIG. 4 is a diagram illustrating software modules of a desktop information management program module and corresponding program data in an exemplary embodiment of the present invention.
Figure 5:
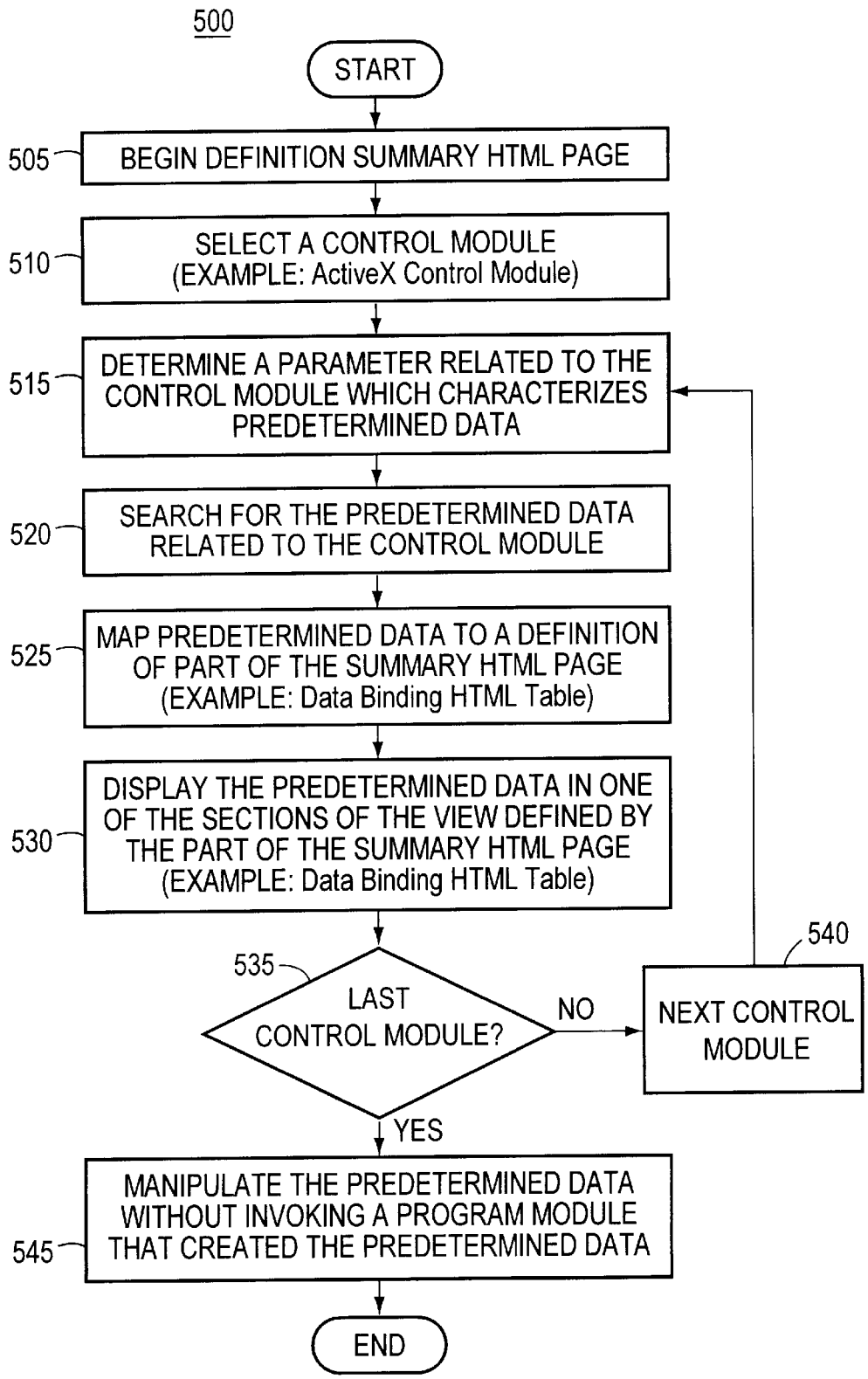
FIG. 5 is a flow diagram illustrating the preferred steps for generating a dynamic summary view of predetermined data in an exemplary embodiment of the present invention.
Figure 6:
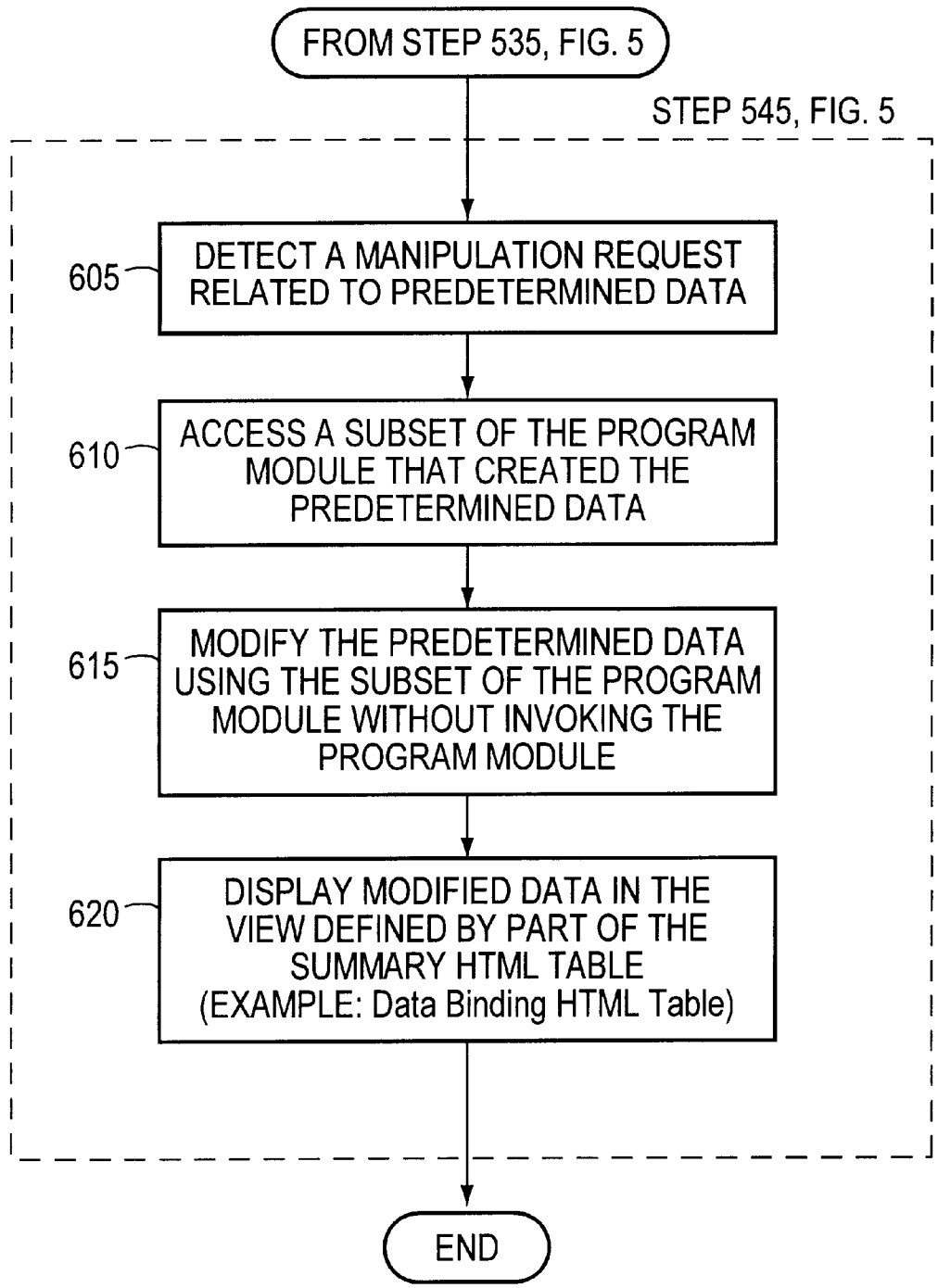
FIG. 6 is a flow diagram illustrating the preferred steps for manipulating the predetermined data as displayed on the dynamic summary view without invoking the program module that created the predetermined data in an exemplary embodiment of the present invention.
Figure 7:
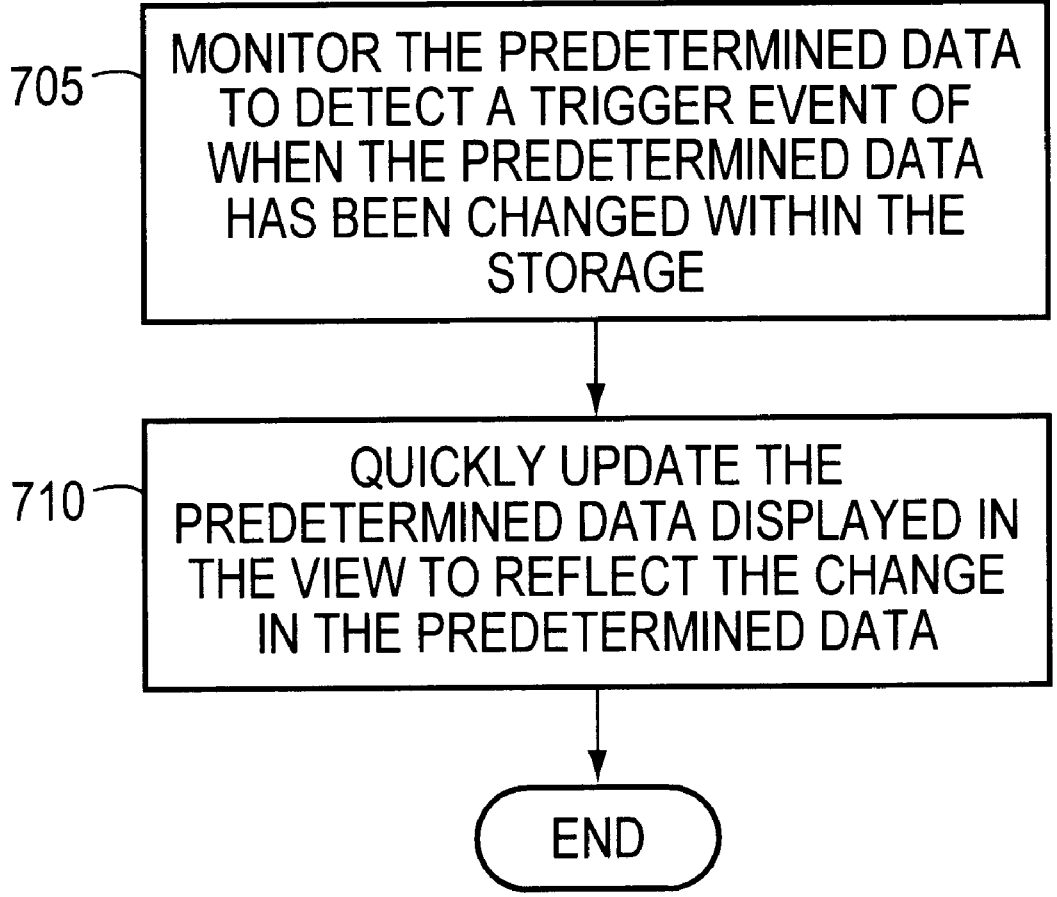
FIG. 7 is a flow diagram illustrating the preferred steps for updating the predetermined data in order to display "live" data on the dynamic summary view in an exemplary embodiment of the present invention.

In FIG. 1, the operating environment for an embodiment of the present invention is illustrated. FIG. 2 illustrates an screen image of an exemplary dynamic summary view of predetermined data. FIG. 3 is a diagram illustrating the concept of binding predetermined data created by various program modules to sections of the dynamic summary view. FIG. 4 is a diagram of software modules within the exemplary desktop DTIM program module. FIGS. 5–7 are flow diagrams describing steps for exemplary methods for generating a dynamic summary view of predetermined data, for manipulating such predetermined data, and for updating such predetermined data.

The detailed description which follows is represented largely in terms of processes and symbolic representations of operations by a conventional computer. The processes and operations performed by the computer include the manipulation of signals by a processor and the maintenance of these signals within data structures resident in one or more media within memory storage devices. Thus, the symbolic representations of operations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to representations of these signals as bits, bytes, words, information, data, objects, blocks, files or the like. It should be kept in mind, however, that these and similar terms are associated with appropriate physical quantities for computer operations, and that these terms are merely conventional labels applied to physical quantities that exist within and during operation of the computer.

It should be understood that manipulations within the computer are often referred to in terms such as searching, determining, accessing, updating, and the like, which are often associated with manual operations performed by a human operator. The operations described herein are machine operations performed in conjunction with various inputs provided by a human operator or user that interacts with the computer.

In addition, it should be understood that the programs, processes, methods, etc. described herein are not related or limited to any particular computer or apparatus, nor are they related or limited to any particular communication architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Referring now to the drawings, in which like numerals represent like elements throughout the several figures, aspects of the present invention and a suitable operating environment will be described.

The Exemplary Operating Environment

FIG. 1 and the following discussion are intended to provide a brief, general description of the suitable computing environment in which the invention may be implemented. While the invention will be described in the general context of an application program that runs on an operating system in conjunction with a personal computer, those skilled in the art will recognize that the invention may also be implemented in combination with other program modules. Generally, program modules include routines, programs, components (such as stacks or caches), data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communication network. In a distributed computing environment, program modules may be located in both local and remote memory storage devices.

Referring now to FIG. 1, an exemplary system for implementing the present invention includes a conventional personal computer 20, including a processor 21, a system memory 22, and a system bus 23 that couples the system memory 22 to the processor 21. The system memory 22 includes read only memory (ROM) 24 and random access memory (RAM) 25. A basic input/output system 26 (BIOS) is stored in ROM 24. The BIOS 26 essentially contains the basic routines that help to transfer information between elements within the personal computer 20 during certain computer operations, such as during start-up. The personal computer 20 further includes a hard disk drive 27, a magnetic disk drive 28 (e.g., that reads from and writes to a removable disk 29), and an optical disk drive 30 (e.g., that reads from an optical disk 31 or reads from or writes to other optical media). The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage for the personal computer 20. Although the description of computer-readable media above includes the hard disk drive 27, a removable magnetic disk 29 and a removable optical disk 31, such as a CD-ROM disk or DVD, it should be appreciated by those skilled in the art that other types of removable media which are readable by a computer, such as magnetic cassettes, flash memory cards, digital tapes, Bernoulli cartridges, and the like, may also be used in the exemplary operating environment.

A number of program modules may be stored in the drives and RAM 25, including an operating system 35, one or more program modules 37, such as the DTIM program module 36, and program data 39 (such as DTIM data preferably called data items) used by program modules.

The operating system 35, in conjunction with the BIOS 26 and associated device drivers, provides the basic interface between the computer's hardware and software resources, the user, and program modules, such as the DTIM program module 36. A user may enter commands and information into the personal computer 20 through a keyboard 40 and an input or pointing device, such as a mouse 42. Other input devices (not shown) may include a microphone, a joystick, a game pad, a satellite dish, a scanner, or the like. These and other input devices are often connected to the processor 21 through a serial port interface 46, such as a game port or a universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote programmable devices, such as a remote computer 49. The remote computer 49 may be a server, a router, a peer device, or other common network node. Typically, the remote computer 49 includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the global Internet.

When used in a LAN networking environment, the personal computer 20 is connected to the local network 51 through a network interface 53. When used in a WAN networking environment, the personal computer 20 typically includes a modem 54 or other means for establishing communications over the wide area network 52, such as the global Internet. The modem 54, which may be internal or external, is connected to the system bus via the serial port interface 46. In a networked environment, program modules depicted relative to the personal computer 20, or portions thereof, may be stored in the remote memory storage device 50. It will be appreciated that the network connections shown are exemplary and other means of establishing a communications link between the personal computer 20 and the remote computer 49 may be used.

As discussed earlier, the preferred embodiment of the present invention is embodied in a program module that works in conjunction with Microsoft Corporation's "WINDOWS 95" operating system and "WINDOWS NT" operating system. However, it should be understood that the invention can be implemented for use with other operating systems, such as IBM Corporation's "OS/2" operating system, SunSoft's "SOLARIS" operating system used in workstations manufactured by Sun Microsystem, Hewlett-Packard's "HP-UX" operating system, and the operating system used in "MACINTOSH" computers manufactured by Apple Computer, Inc.

Likewise, those skilled in the art will appreciate that the DTIM program module 36 provides a wide variety of features and functions in addition to aspects described below with respect to an embodiment of the present invention.

Object Oriented Programming Environment

In the exemplary embodiment of the present invention, the DTIM program module 36 is implemented using control modules, such as ActiveX controls, within an object-oriented programming environment. Those skilled in the art will understand that within an object-oriented programming environment, an object model defines protocols for object communication. In other words, the object model abstractly defines a mechanism for disparate program modules, such as software objects, to communicate and share information and data with one another. An object adhering to the object model typically implements such a mechanism by providing interfaces to the functionality and data encapsulated by the object. An example of such an object model is the Component Object Model (COM) defined by the Microsoft Corporation's Object Linking and Embedding (OLE) standard 2.0. Additional details of COM and OLE 2.0 can be obtained by referring to "Inside OLE 2" by Kraig Brockschmidt or by referring to "OLE 2.0 Programmers Reference", both published by Microsoft Press.

A control or control module is essentially a program module capable of extending the framework defined by such an object model. An ActiveX control is built upon the object model as a mechanism or component for supplying additional services. For example, the ability to provide additional services allows an ActiveX control to make use of automation. Automation is the ability of a program module to control another program module's object by setting and reading properties on the object and invoking methods defined by the object. The additional services also allow an ActiveX control to provide containment. In general, containment allows one object to embody another object and expose any number of the contained object's interfaces as its own.

Those skilled in the art will be familiar with ActiveX controls and will recognize that ActiveX controls provide features and services in addition to those mentioned above. Additional details about ActiveX controls can be obtained by referring to "ActiveX Controls Inside Out" by Adam Denning and published by Microsoft Press.

Screen Display of a Dynamic Summary View

In the context of the above preface on object-oriented programming and ActiveX controls, an embodiment of the present invention is described for generating a dynamic summary view of predetermined data created by a program module. As previously mentioned, the dynamic summary view has the capability to manipulate the predetermined data shown within the view without having to invoke the program module and is preferably implemented using ActiveX controls (more generally called control modules). FIG. 2 is a screen image of an exemplary dynamic summary view of predetermined data.

Referring now to FIGS. 1–2, a window 200 is illustrated from a user's perspective. The window 200 is generated by the DTIM program module 36 and includes a frame 205 within which is an exemplary dynamic summary view 210 of predetermined data.

The exemplary dynamic summary view 210 displays a variety of display sections 215a–e. Each display section 215a–e presents a specific type of predetermined data. In the exemplary embodiment, the predetermined data is desktop information management data which is important to a user. For example, the predetermined data may include information on the user's current electronic mail 215a, the user's calendar appointments for today 215b, a list of important tasks 215c, and a contact field 215d.

Selecting what data is "predetermined" and should be displayed on the view 210 is accomplished by making selections for each type of data from a customize dialog (not shown). In this way, a determination is made with the user's selections to identify the predetermined data for each type of data. For example, a parameter may be selected on the customize dialog to designate important task data 215c as including tasks that are to be completed today. Another parameter may also be selected to designate data about today's appointments 215b as the important calendar type of data displayed on the view 210. Thus, information on today's tasks is displayed in the view 210 along with only today's appointments.

In an exemplary embodiment aspect of the present invention, the summary view is "dynamic" because the predetermined data can be manipulated without invoking the program module which created the predetermined data. This is useful for fundamental manipulations of the predetermined data presented in the view 210. For example, the user is able to change the status of a task 220 called "TASK 2" on the list 215c without executing the program module responsible for creating the list of tasks 215c. In another example, the user is able to click on the "Inbox" area 225 to read an electronic mail message without launching or invoking the program module responsible for reading, creating, and sending electronic mail. This advantageously avoids the time-consuming need for the user to launch individual program modules and to switch between fully executing program modules.

In that exemplary embodiment, the summary view is "dynamic" because it can respond to data updates by updating the presentation of the data. In other words, the predetermined data displayed on the view 210 is refreshed or updated whenever the underlying data is changed or modified. In the above example where the user reads one of the unread electronic mail messages, the view 210 is operative to sense the change in the data and to update the view 210 to display the new number of unread mail messages.

While the predetermined data displayed on the exemplary view 210 includes only desktop information management data, it is important to understand that the principles of the present invention are not limited to desktop information management data created by the DTIM program module 36. Those skilled in the art will realize that other types of predetermined data may be linked into the view 210 as well. For example, another section (not shown) of the view 210 may include a listing of the user's most recently used documents. Additionally, another section (not shown) of the view 210 may include a listing of bill payment reminders on financial bills that are currently due. While the list of most recently used documents and the list of bill payment reminders may be created by distinct program modules other than the DTIM program module 36, the lists may still be included within the view 210 in accordance with an embodiment of the present invention. Thus, those skilled in the art will appreciate that other data created by programs other than the DTIM program module 36 may appear within the view 210.

In summary, the exemplary dynamic summary view 210 is a single, customizable presentation of various types of predetermined data. The user determines which data is important (or more generally which data is deemed to be the predetermined data) by selecting parameters from a customization dialog. The predetermined data is updated and can be manipulated directly from the dynamic summary view 210. Therefore, the predetermined data may be manipulated or conveniently modified without the need to launch other program modules and without having to switch between multiple program modules.

Data Relationships to a Dynamic Summary View

A review of the interrelationship between the underlying user-controlled data and the dynamic summary view 210 is helpful to understand the inventive aspects exhibited by an exemplary embodiment of the present invention. FIG. 3 is a conceptual diagram illustrating how the predetermined data created by various program modules is related to different sections of the exemplary dynamic summary view.

Referring now to FIGS. 1, 2 and 3, the dynamic summary view 210 is illustrated in relation to the program data 39, such as DTIM data items 300. In general a data item is simply a type of data used by a particular program module. In the exemplary embodiment, the DTIM data items 300 are dynamically created by different program modules within the DTIM program module 36. The DTIM data items 300 collectively comprise different types of data (such as mail items 305, calendar items 310, task items 315, and contact items 320) corresponding to the different program modules that created the DTIM data items 300. While the program data 39 includes DTIM data items 300, the program data 39 may include other data created by other program modules.

Looking at the different data types in more detail, a mail item 305 represents an electronic mail message. In the exemplary embodiment, mail items 305 are characterized as mail messages that are in the process of being drafted, that have been received and read, that have been received but are still unread, and that have already been sent out to another computer user.

A calendar item 310 represents an appointment on the user's calendar. In the exemplary embodiment, calendar items 310 are characterized as scheduled appointments on specific dates.

A task item 315 represents a task for the user to do, similar to an item on a hand written "to-do" list. In the exemplary embodiment, task items 315 are characterized by their due dates. For example, task items 315 that are due today will be displayed at the top of the list, followed by task items 315 that are overdue. In another embodiment, the task items 315 may be displayed depending upon a relative priority to each other. One task item 315 may be designated as a "High" priority task while another task item 315 may be designated as a "Low" or "Medium" priority task.

A contact item 320 represents information about a person or contact known to the user. Such information often includes the contact's name, address, and phone number.

When creating the dynamic summary view 210, a master HTML table or page is defined representing the dynamic summary view 210. The master HTML page contains separate individual data binding HTML tables representing different sections of the view 210. While the master HTML page defines the general layout of the view 210, each data binding HTML table defines the content and functionality of the different sections of the view 210. Each data binding HTML table is mapped back or linked to specific DTIM data items 300 (predetermined data). The mechanism for linking the data is generally called data binding. Data binding basically uses control modules, such as ActiveX controls, to link or tie the data displayed in the HTML table back to the actual stored data. In other words, data binding provides a very tight connection between the predetermined data as seen in the view 210 and as stored. Data binding is discussed in more detail below with regard to FIG. 4.

When the dynamic summary view 210 is generated, a determination is made about which of each type of data to present within the sections of the dynamic summary view 210. For example, the user may only want to see the number of unread mail messages. The number of unread mail messages is determined by filtering the mail items 305 for read/unread status. The number of unread mail messages are then linked to part of the HTML page (e.g., linked to a mail data binding HTML table).

In another example, the user may only want to see today's appointments. Today's appointments are determined by filtering the calendar items 310 by date. A list of today's appointments are then linked to another part of the HTML page (e.g., linked to a calendar data binding HTML table) so that the list of today's appointments is displayed in the appropriate section 215b of the view 210.

The predetermined data presented within sections of the dynamic summary view 210 is user-relevant information. In the exemplary embodiment, such user-relevant information is stored as the data items 300. In this manner, user-relevant information is different than system data or other system information because the user-relevant information is generally information that a particular user deems most important and useful. More specifically stated, information is deemed to be user-relevant information if a particular user needs or uses the information in order to properly manage the user's activity throughout a period of time, such as a day. For example, systematic data or information on the setting of the volume control within the operating system 35 is not user-relevant information. However, electronic mail messages sent to or created by a particular user is information that can be considered user-relevant. Other examples of user-relevant information may include, but aren't limited to, a list of recently accessed documents, universal resource locator (URL) addresses (also known as links) to important websites on the World Wide Web, and important shared group data items (such as contact information that group members need to call often, a list of group meetings, or logged activity of a group).

When the user desires to manipulate the data displayed in the dynamic summary view 210, part of the DTIM program module 36 responds to a manipulation request. A manipulation request is essentially any input to part of the DTIM program module 36 or appropriate control module indicating that the user desires to manipulate a specific type of data. An example of a manipulation request is a message sent by the operating system 35 in response to when the user clicks a button on the mouse 42 when the cursor is centered over one of the tasks.

An important feature of the present invention is that in response to a manipulation request for a particular data item, a subset of the program module that created the particular data item is accessed. Advantageously, this is accomplished without the need to invoke the entire program module. In other words, the entire program module that created the particular data item does not need to be launched and the user can directly manipulate the data item from the dynamic summary view 210. Manipulating the data item can be accomplished by accessing only the most useful subsets of the program module, such as making calls to a particular method defined within the program module or executing a hard coded control using the subset of the program module. In this manner, a subset of the functionality or a subset of the user interface of a particular program module may be cleverly used without the burdensome and time-consuming need to invoke and navigate to the primary user interface for the particular program module.

For example, the user may desire to check off one of the tasks 215c as being complete without having to separately launch the program module responsible for creating and managing the task items 315. The user simply moves the mouse 42 to position the cursor over one of the tasks 215c displayed on the dynamic summary view. When the user clicks a button on the mouse 42, the status of the task is advantageously modified without the need to switch to a different window.

Therefore, the underlying data is tied to parts of the HTML page (e.g., the data binding HTML tables) defining the dynamic summary view 210 and the underlying data may be manipulated using the dynamic summary view 210.

Software Modules

A review of the interrelationship between the underlying data and software modules within the DTIM program module 36 is helpful in order to understand how the HTML page containing the data binding HTML tables and representing the dynamic summary view 210 are defined and how data is manipulated in an embodiment of the present invention. FIG. 4 is a diagram illustrating modules of the DTIM program module 36 and corresponding program data 39 in an exemplary embodiment of the present invention.

Referring now to FIGS. 1–4, the DTIM program module 36 comprises several program modules (such as a mail module 405, a calendar module 410, a task module 415, and a contact module 420), which create different types of data. In the exemplary embodiment, the mail module 405 is the program module responsible for creating mail messages typically stored as mail items 305. The calendar module 410 is the program module responsible for creating and managing an electronic calendar of appointments. The appointments are typically stored as calendar items 310. The task module 415 is the program module responsible for creating and managing a list of the user's tasks. These tasks are typically stored as task items 315. The contact module 420 is the program module responsible for creating and managing information about a person or contact know to the user. Such information is typically stored as contact items 320.

In the exemplary embodiment, a master HTML file (also known as a summary HTML page 455) is defined in the DTIM program module 36 with multiple data binding HTML tables 462–475 representing the dynamic summary view 210. In general, an HTML page is a conventional HTML table element introduced in HTML 2.0 with NETSCAPE Extensions (later incorporated into the HTML 3.0 standard). The HTML page is essentially a collection of information arranged in a framework of rows and columns. The intersection of each row and column of the page is called a cell. Header information typically defines the form of the HTML page. Definitions of the content of the cells are typically implemented as embedded HTML tables called data binding HTML tables, which define the content of parts of the HTML page relative to the underlying data. In other words, representations of each section of the view 210 defined by a different data binding HTML table may be placed within the appropriately located cell of the HTML page.

In the exemplary embodiment of the invention, the content of each data binding HTML table 462–475 is typically defined by calling a dynamic-link library (DLL) 460 of control modules. In general, a DLL is a set of executable routines or controls that may be stored separately and loaded only when needed by the program module that calls them. Those skilled in the art will be familiar with the DLL concept and implementation. The DLL 460 in the exemplary embodiment comprises a series of control modules 425–440, preferably called datasource controls, for linking the data displayed in the data binding HTML tables 462–475 back to the data as stored in the DTIM data items 300. These control modules 425–440 may be implemented in a variety of ways, such as with conventional ActiveX controls. However, the implementation of the control modules 425–440 in the exemplary embodiment of the present invention should not be considered as a limitation on the principles of the present invention.

In general, data binding refers to the mapping of any data, such as tabular data, to an HTML table. An HTML table uses the "<tr>" and "<td>" tags to specify rows and columns of a table (such as the data binding HTML tables 462–475) in the HTML file (such as the HTML page 455). This is static and the data of the table is not included in the HTML file itself. Data binding allows the use of data binding HTML tables in conjunction with a "datasource" or control module (which has access to the data). Hence, the data is not contained in the HTML file itself.

Essentially, a data binding HTML table within the HTML file "asks" the datasource control to provide each row and column of the table it needs to populate. The syntax for an exemplary data binding HTML table defined within an HTML file, such as the summary HTML page 455, is as follows:

<table datasrc="#CalList">
  <tr>
    <td><div datafld="Next"DATAFORMATAS= "html"></DIV></TD>
    <td><div datafld="StartEnd"DATAFORMATAS= "html"></DIV><TD>
    <td><div datafld="Subject"DATAFORMATAS= "html"></DIV><TD>
  </tr>
</table>

The preceding exemplary data binding HTML table hooks up to a datasource control called "Calendar," such as the calendar module 430, which may be defined as an ActiveX control or some other type of control module. In the above example, the datasource control is declared within the HTML file using the "<OBJECT>" tag as follows:

<object id="CalList" classid="CLSID:0468C085-CA5B-11DO-AF08-00609797F0E0">
  <param name="Module" value="Calendar">
</object>

Essentially, this declaration directs a search for a datasource control that has the specified identification, i.e., classID. When that particular datasource control is found, it is made available to the HTML file.

In the exemplary embodiment, there are essentially two things going on within the data binding HTML table. The first is that the table is linked to a control module that will be its datasource. The link is defined in the first line of the table definition as follows: <table datasrc="#CalList">. This effectively says: "Take the control module declared as "CalList" and use it as the datasource control or control module that will link this table to the data." The second thing going on is that within the data binding HTML table, each table column is linked to a column of data. This happens with lines as follows:

<td><div datafld="Next"DATAFORMATAS="html"></DIV></TD>
  <td><div datafld="StartEnd"DATAFORMATAS= "html"></DIV><TD>
  <td><div datafld="Subject"DATAFORMATAS= "html"></DIV><TD>

Since the actual data is typically nothing but a "table" with a certain number of "rows" and "columns", the datasource control will be first asked for the number of rows and columns. Next, for each row and 40 column, the datasource control or control module will be asked for the data in that particular cell. For example, the third line of the exemplary column definitions may be interpreted to basically say: "Okay, here's the third column (<td>). The datasource control (CalList) has a column called "Subject", so let's link that column in the data items 300 to this column (<td>) in the data binding HTML table." In summary, the program code implementing the data binding HTML table will ask for data in each row and column in the datasource control and it will then display it in the HTML page.

Although the exemplary embodiment uses data created by different parts of the DTIM program module 36, those skilled in the art will appreciate that data created by other program modules 37 may be linked to parts of the same summary view 210 via control modules (not shown) associated with the other program modules 37 and not associated with the DTIM program module 36.

Furthermore, although the exemplary embodiment has separate data binding HTML tables and distinct control modules for each program module, it is contemplated that a data binding HTML table and its control module can be implemented to display information created from several different and distinct program modules. For example, it may be advantageous to display both the tasks due today and the appointments for today in a single combined section (not shown) of the view 210 generated by a single control module (not shown) capable of interfacing with both the calendar module 410 and the task module 415.

When generating the dynamic summary view 210, summary HTML page header information about the summary HTML page 455 is first defined providing the general layout parameters of the view 210. After the layout parameters are defined, the individual data binding HTML tables 462–475 (representing different parts of the summary HTML page 455 and the content of different sections of the view 210) are defined. The structure of each of the data binding HTML tables 462–475 is defined in each table's section of the summary HTML page 455 in a nested approach.

In more detail, the contents of the individual data binding HTML tables 462–475 are typically defined by referring to the appropriate control module for each type of data to be displayed on the summary view 210. For example, in the exemplary embodiment, a mail control module 425 is referred to within the HTML table definition to define the content of the mail section 215*a* of the view 210. Furthermore, a calendar control module 430 is referred to within the HTML table definition to define the content of the calendar section 215*b* of the view 210. In summary, the content of the summary HTML page 455 is defined using the control modules of the DLL 460 in a data binding role.

The HTML page 455 is read to generate the dynamic summary view 210. When reading the HTML page 455 to generate the view 210 and a control module is referred to within a data binding HTML table 462–475. The specific control module from the DLL 460 determines which of each type of data to present within the sections of the dynamic summary view 210. For example, the user may only want to see today's tasks in the dynamic summary view 210. The task control module 435 determines the which are today's tasks by filtering the task items 315 by date. The task control module 425 then links those tasks to part of the HTML page 455 (via a task data binding HTML table 470) so that the list of today's tasks can be displayed in the appropriate section 215*c* of the view 210.

In another example, the user may only want to see today's appointments. The calendar control module 430 determines today's appointments by filtering the calendar items 310 by date. The calendar control module 430 then links a list of today's appointments to another part of the HTML page 455 (via a calendar data binding HTML table 465) so that the list of today's appointments is displayed in the appropriate section 215*b* of the view 210.

When the view 210 is displayed and a manipulation request is detected indicating that the user desires to manipulate a specific type of data, the appropriate control module within the DLL 460 responds by accessing part of the corresponding program module without invoking the program module. In the exemplary embodiment, this may be implemented using either scripts typically written in Javascript to access the subset of the program module or code written directly into the appropriate data binding HTML table.

The scripts typically access the subset of the program module's code by making calls to a particular method defined within the program module or executing a hard-coded control using the subset of the program module. Javascript is essentially a type of non-compiled programming language that can be embedded within HTML pages or tables. Those skilled in the art will be familiar with embedded scripting languages such as Javascript. However, those skilled in the art will also realize that there are other implementations of accessing a subset of a program module other than by using compiled or non-compiled scripts.

For example, the user may desire to find one of the contacts 215*d* without invoking the program module (a contact module 420) associated with the related data (the contact data items 320). When the user positions the cursor over appropriate contact section 215*d* and clicks a button on the mouse 42, a control module within the DLL 460 (preferably a contact control module 435 implemented as an ActiveX control) detects the click as a manipulation request associated with the contact items 320. The contact control module 435 responds to the user's manipulation request by accessing a subset of the contact module 420. In one embodiment, a Javascript is used to call a method from an object via an interface defined by the program module (the contact module 420). The called method may manipulate or modify the contact items 320 by finding and manipulating the desired contact. In another embodiment, a hard-coded control module may be accessed using existing code within the contact module 420 to find or manipulate the desired contact. In summary, the underlying data (e.g., the desired contact) is advantageously found or modified without the need to separately invoke the entire contact module 420 and switch to a different window associated with the contact module 420.

In another implementation, the code within an appropriate data binding HTML table is capable of being executed to directly instruct the appropriate control module to manipulate the underlying data. For example, each row in the task data binding HTML table 470 represents a check box and some text that describes a particular task as shown in the list of tasks 215*c* within the view 210. The state of the check box represents the completeness of the particular task. When the user desires to check off one of the tasks 215*c* as being complete without invoking the program module (a task module 415), the user positions the cursor over one of the tasks 215*c* and clicks a button on the mouse 42. In response, code within a row of the task data binding HTML table 470 executes to send a notification to the task control module 435 with row and column information to identify which tasks was modified. The modification to the task data items 315 is then performed by the task control module 435 in order to permanently save the modification. This is advantageously performed without the time consuming need to open the task module 415 and set the status of the particular task to be complete within the task data items 315.

Once the data is modified, the modified data is then displayed on the view 210. This is elegantly accomplished in the exemplary embodiment with the linking or data binding mechanism defining the content of the data binding HTML tables 462–475 within the sections of the summary HTML page 455. For example, if the subject in an appointment changes, the calendar control module 430 "tells" the appropriate data binding HTML table that a particular cell in the summary HTML page 455 (represented by a row and a column) has changed. The code within the summary HTML page 455 implementing the appropriate data binding HTML table then queries the calendar control module 430 again for this particular cell.

The predetermined data displayed on the view 210 can also be updated to present "live" data. The control modules 425–440 monitor the data 300 to detect what is called a "trigger event." A trigger event is generally defined as an indication that the data has changed. In one embodiment of the invention, the control modules 425–440 update the view 210 by periodically monitoring or checking to determine whether the data 300 has changed. In the exemplary embodiment, periodic monitoring is typically done every few seconds to provide a sense of "live" data to the user. In another embodiment of the present invention, the data is monitored and responds to a trigger event by updating the data only after a trigger is received. A trigger is generally any indication that the data has changed, i.e., indicates a trigger event has occurred. Thus, monitoring may be either periodic or non-periodic (on-demand) or some combination thereof.

If the data has changed, the appropriate control module reads the new value of the data as stored and the content of the appropriate data binding HTML table is updated to reflect the new values. Thus, the updated content of a portion of the HTML page 455 (i.e., the updated data binding HTML table) is then reflected as updated data within a section 215 of the dynamic summary view 210. For example, if the user makes a change in the summary HTML page 455 itself by clicking on a "check-box" in the Tasks 215c to inform the task control module 435 that a task is complete, then the task control module 435 is "told" that a particular row and table has been modified. The task control module 435 can now modify the underlying task data items 315 to reflect this change.

As previously mentioned, selecting what user-relevant data is "predetermined" and should be displayed on the view 210 is typically accomplished by making selections for each type of data from a customize dialog. In the exemplary embodiment, the customize dialog is created by a customize module 445 within the DTIM program module 36. The customize module 445 is used to determine the user's selections of parameters, such as a type of filter, for determining the predetermined data for each type of data. For example, a parameter or type of filter may be selected using the customize module 445 to designate data about today's appointments 215b or data about today's tasks 215c to be the important type of data displayed on the view 210. Thus, the customize module 445 interfaces with the control modules 425–440 in the DLL 460 to determine which data of each data type is deemed to be "predetermined" (e.g., important) so that it is displayed within the dynamic summary view 210.

Flow Diagrams

In the context of the above-described software modules, FIGS. 5–7 are flow diagrams illustrating various aspects of the present invention. FIG. 5 is a flow diagram illustrating an exemplary method for generating a dynamic summary view of predetermined data. FIG. 6 is a flow diagram illustrating an exemplary method for manipulating the predetermined data as displayed on the dynamic summary view without invoking the program module that created the predetermined data. Finally, FIG. 7 is a flow diagram illustrating an exemplary method for updating the predetermined data in order to display "live" data on the dynamic summary view according to an embodiment of the present invention.

Referring now to FIGS. 1, 3, 4, and 5, the exemplary method 500 for generating a dynamic summary view of predetermined data begins at step 505 where the definition of a master HTML file (such as the exemplary summary HTML page 455) is begun. Typically, within this summary HTML page definition, the header information for each data binding HTML table is defined along with the row and column structure of each data binding HTML table. In general, steps 510–545 describe how the content of each individual data binding HTML table related to the dynamic summary view is defined by each control module associated with the different types of data.

At step 510, one of the control modules, such as one of the control modules 425–440, is selected. At step 515, a parameter is determined related to the selected control module. The parameter essentially characterizes predetermined data. For example, the parameter may be a type of filter selected to designate important calendar data 215b, such as data about today's appointments.

At step 520, the data related to the selected control module is searched to find the predetermined data. For example, if the calendar module 410 was selected, the calendar items 310 are searched by the calendar control module 430 for today's appointments (the predetermined data).

At step 525, the predetermined data is mapped to a definition of part of the summary HTML page (i.e., a data binding HTML table) representing the dynamic summary view. Mapping the predetermined data to the definition of the data binding HTML table is typically accomplished using the above-described data binding technique of referring to the selected control module within the appropriate part of the data binding HTML table definition.

At step 530, the predetermined data in one of the sections of the dynamic summary view as defined by the summary HTML page is displayed as the appropriate data binding HTML table is read. At step 535, if the selected control module is not the last control module, then an additional data binding HTML table must defined to link other data to other parts of the dynamic summary view and step 535 proceeds to step 540. At step 540, the next control module is selected before continuing back to step 515. However, if the selected control module is the last control module, the data binding HTML tables representing the content of parts of the HTML page are defined and step 535 proceeds to step 545.

At step 545, the summary HTML page has been completely defined and the dynamic summary view is displayed to the user. At this stage, the user is able to manipulate the predetermined data displayed on the view without invoking the program module that created the predetermined data. For example, if the user selects one of today's appointments displayed on the dynamic summary view 210, the calendar control module 430 can manipulate the underlying calendar data items 310 related to the selected appointment without invoking the entire calendar program module 410.

FIG. 6 is a flow diagram illustrating the preferred and more detailed steps for manipulating the predetermined data as displayed on the dynamic summary view without invoking the program module that created the predetermined data in an exemplary embodiment of the present invention. Essentially, FIG. 6 describes step 545 from FIG. 5 in more detail.

Referring now to FIGS. 1, 3, 4, 5, and 6, the method 600 begins at step 605 after step 535 from FIG. 5. At step 605, a manipulation request related to the predetermined data is detected. For example, the manipulation request may be a detected click from the mouse 42 when the cursor is positioned over one of today's appointments 215b (the predetermined data) as displayed on the dynamic summary view 210.

At step 610, a subset of the program module that created the predetermined data is accessed in response to the detected manipulation request. For example, a subset of the calendar module 410 is be accessed when the click is detected over one of today's appointments 215b. The actual subset of the calendar module 410 accessed may be an encapsulated method for editing the time of the appointment or may be a method for reflecting a completion status for the appointment. The important aspect is that the subset is accessed without the need to invoke or fully launch the calendar module 410.

At step 615, the predetermined data is modified using the accessed subset of the program module. This is all advantageously accomplished without having to invoke the program module. At step 620, the modified data is then displayed in the dynamic summary view 210 defined by the summary HTML page 455. Thus, the view 210 is dynamic via its capability of manipulating the predetermined data without invoking the underlying program module.

In addition to the capability of manipulating the predetermined data, the dynamic summary view is dynamic in that the view is updated with "live" data. FIG. 7 is a flow diagram illustrating the preferred steps for updating the predetermined data in order to display "live" data on the dynamic summary view 210 in an exemplary embodiment of the present invention.

Referring now to FIG. 1, 3, 4, 5, and 7, the method 700 begins at step 705 after step 545 from FIG. 5. At step 705, the predetermined data is monitored to detect a trigger event. As previously stated, a trigger event is generally defined as an indication that the predetermined data has changed. For example, if an appointment is changed, a trigger event related to the changed appointment is detected allowing the calendar ActiveX control 430 to respond. In one embodiment of the invention, monitoring is periodically done to check for or detect a trigger event. However in another embodiment of the invention, the monitoring is done in what may be called an asynchronous or on-demand notification mode where the control module for the predetermined data receives a trigger to indicate that a trigger event has occurred.

At step 710, the value of predetermined data displayed in the view is quickly updated to reflect the change in the predetermined data and maintain that "live" data is presented to the user. Thus, in the above example, the calendar ActiveX control 430 responds by reading the changed calendar data items 310 and updating the predetermined data shown within the calendar section 215b of the dynamic summary view 210.

Conclusion

From the foregoing description, it will be appreciated that embodiments of the present invention provide a system and method for generating a dynamic summary view 210 of predetermined data, such as unread mail messages or today's appointments, using control modules (such as ActiveX controls). The dynamic summary view 210 is typically generated by defining an HTML page 455 with several data binding HTML tables 462–475, each of which link part of the page to predetermined data within a storage of data, such as DTIM data items 300. For each type of data, a parameter (such as a specific type of data filter) is determined which characterizes the predetermined data from the other data within the storage. The control modules 425–440 (related to the types of data) search the storage, determine the predetermined data using the parameter and then display the predetermined data using a data binding HTML table within a section of the dynamic summary view 210. Upon detecting a manipulation request, such as when a user clicks on a button of the mouse 42, the control module accesses a subset of the program module that created the predetermined data. This is done without invoking the entire program module. Accessing the subset of the program module may be done by executing a script to call defined methods of the objects within the program module (via an ActiveX control) or accessing a control module defined within the program module. The view 210 is also dynamic in that it is updated to display only "live" data via monitoring for trigger events indicating the underlying data has changed and updating the predetermined data accordingly.

The foregoing system and method may be conveniently implemented in one or more program modules based upon the flow diagrams in FIGS. 5–7 and their related descriptions. No particular programming language is required for carrying out the various procedures described above because it is considered that the operations, functions, methods, steps, and procedures described above and illustrated in the accompanying drawings are sufficiently disclosed to permit one of ordinary skill in the art to practice the present invention. Moreover, there are many computers and operating systems which may be used in practicing the present invention and therefore no detailed computer program could be provided which would be applicable to all of these many different systems. Each user of a particular computer will be aware of the language and tools which are most useful for that user's needs and purposes.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. A method for managing user-relevant data, comprising:
providing a user with a graphical user interface;
receiving through the graphical user interface a selection by the user of data created by a first program module;
receiving through the graphical user interface a selection by the user of data created by a second module;
displaying the data created by the first program module and the data created by the second program module together in a summary view that allows the user to simultaneously view the data created by the first program module and the data created by the second program module without launching the first program module or the second program module;
receiving an indication that the user wants to modify the data created by the first program module;
in response to the indication, modifying the data created by the first program module using a subset of the first program module without invoking the first program module; and
displaying the modified data in the summary view.

2. A compute-readable medium having computer-executable instructions for performing the method of claim 1.

3. A computer system adapted to perform the method of claim 1.

4. A method for managing user-relevant data, comprising:

providing a user with a graphical user interface that includes a first plurality of data filters for data created by a first program module and a second plurality of data filters for data created by a second program module;

receiving through the graphical user interface a selection by the user of a first data filter from the first plurality of data filters and a selection by the user of a second data filter from the second plurality of data filters;

deriving a first data subset by applying the first data filter to the data created by the first program module;

deriving a second data subset by applying the second data filter to the data created by the second program module;

displaying the first data subset and the second data subset together in a summary view that allows the user to simultaneously view both the first data subset and the second data subset without launching the first program module or the second program module;

receiving an indication that the user wants to modify the first data subset;

in response to the indication, modifying the first data subset using a subset of the first program module without invoking the first program module; and displaying the modified first data subset in the summary view.

5. A computer-readable medium having computer-executable instructions for performing the method of claim 4.

6. A computer system adapted to perform the method of claim 4.

* * * * *